(12) United States Patent
Iwamura et al.

(10) Patent No.: US 7,463,578 B2
(45) Date of Patent: Dec. 9, 2008

(54) TRANSMISSION PARAMETER CONTROL DEVICE

(75) Inventors: Naoto Iwamura, Kawasaki (JP); Seiichi Yamaguchi, Kawasaki (JP); Yasushi Miyagawa, Kawasaki (JP); Shinya Hatakeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 375 days.

(21) Appl. No.: 10/571,335

(22) PCT Filed: Sep. 10, 2003

(86) PCT No.: PCT/JP03/11575

§ 371 (c)(1),
(2), (4) Date: Mar. 7, 2006

(87) PCT Pub. No.: WO2005/027394

PCT Pub. Date: Mar. 24, 2005

(65) Prior Publication Data

US 2007/0030821 A1 Feb. 8, 2007

(51) Int. Cl.
*G01R 3/08* (2006.01)
*G06F 11/00* (2006.01)
*G08C 15/04* (2006.01)
*H04J 1/16* (2006.01)
*H04J 3/14* (2006.01)

(52) U.S. Cl. .................. 370/216; 370/328; 370/349
(58) Field of Classification Search .......... 370/216, 370/328, 349
See application file for complete search history.

(56) References Cited

U.S. PATENT DOCUMENTS 6,615,382 B1  9/2003  Kang et al.

2005/0128998 A1*  6/2005  Jelitto et al. ............... 370/349
2005/0286410 A1*  12/2005  Truong et al. .............. 370/216
2007/0030821 A1*  2/2007  Iwamura et al. ............ 370/328

FOREIGN PATENT DOCUMENTS

| JP | 8-279890 | 10/1996 |
| JP | 2000-332829 | 11/2000 |
| JP | 2001-36462 | 2/2001 |
| JP | 2001-127774 | 5/2001 |
| JP | 2001-186149 | 7/2001 |
| JP | 2001-320407 | 11/2001 |
| JP | 2002-204278 | 7/2002 |
| JP | 2002-325095 | 11/2002 |
| JP | 2003-152752 | 5/2003 |
| JP | 2003-188855 | 7/2003 |
| WO | WO 00/52884 | 9/2000 |
| WO | WO 00/60785 | 10/2000 |
| WO | WO 03/021899 | 3/2003 |

OTHER PUBLICATIONS

International Search Report dated Dec. 2, 2003.

\* cited by examiner

*Primary Examiner*—William D Cumming
(74) *Attorney, Agent, or Firm*—Katten Muchin Rosenman LLP

(57) ABSTRACT

A transmission parameter control apparatus that improves transmission quality of real-time media in a transmission route that includes a wireless section in at least a part of the transmission route. The transmission parameter control apparatus is connected to a terminal via a network and is connected to a mobile terminal via a wireless link. The apparatus includes: an obtaining part for obtaining a quality parameter indicating transmission quality corresponding to the wireless link from signals of downlink and uplink transmission routes; and an adjustment part for adjusting a value of a transmission parameter determining a transmission scheme in the wireless link according to the quality parameter.

12 Claims, 14 Drawing Sheets

FIG.5

| | | TRANSMISSION PARAMETER ||
| --- | --- | --- | --- |
| | | NUMBER OF RETRANSMISSIONS | TRANSMISSION PRIORITY |
| JITTER | WHEN LARGE | DECREASE | HEIGHTEN |
| | WHEN SMALL | INCREASE | LESSEN |

FIG.8

|  | TRANSMISSION PARAMETER ||
|  | NUMBER OF RETRANSMISSIONS | ERROR CORRECTION SCHEME |
| --- | --- | --- |
| PACKET DISCARD RATIO — WHEN LARGE | INCREASE | HEIGHTEN ORDER |
| PACKET DISCARD RATIO — WHEN SMALL | DECREASE | LESSEN ORDER |

FIG.11

|  | | TRANSMISSION PARAMETER | | |
| --- | --- | --- | --- | --- |
|  | | NUMBER OF RETRANSMISSIONS | ERROR CORRECTION SCHEME | TRANSMISSION PRIORITY |
| DELAY TIME | WHEN LARGE | DECREASE | LESSEN ORDER | HEIGHTEN |
|  | WHEN SMALL | INCREASE | HEIGHTEN ORDER | LESSEN |

TRANSMISSION PARAMETER CONTROL DEVICE

CROSS-REFERENCE TO RELATED APPLICATION

This application is a U.S. National Phase application of International Application PCT/JP2003/011575 filed Sep. 10, 2003, the contents of which of herein wholly incorporated by reference.

BACKGROUND OF THE INVENTION

1. Field of the Invention

The present invention generally relates to a technical filed of data transmission. More particularly, the present invention relates to a transmission parameter control apparatus for performing data transmission using RTP (Real-time transport protocol) and RTCP (RTP control protocol) on a transmission route including a wireless section in a part of the transmission route.

2. Description of the Related Art

The RTP and/or the RTCP are protocols for transmitting real-time media such as voice signals and video signals. The real-time media are generated from data that are generated continuously in terms of time. For reproducing the data in a receiving side, it is necessary to reproduce the data at time intervals the same as those in a sending side (a side in which the data is generated). Therefore, for transmitting the real-time media, qualities (quality parameters) such as packet transfer delay time, jitter indicating fluctuations of the packet transfer delay time, and packet discarding ratio are especially important.

Japanese Laid-Open Patent Application No.2002-204278 (Patent document 1) discloses a technology for performing bit-rate adjustment and error tolerance level change for transmission data in the sending side according to a state of a transmission route, based on the jitter and the packet loss ratio (discard ratio) obtained from the receiving side. According to this method, since the transmission method can be adjusted so that proper data transmission is performed for the receiving side, high quality transmission can be performed for real-time media data. In the same way, in a technology disclosed in Japanese Laid-Open Patent Application No. 2002-325095 (patent document 2), a transmission data rate (bandwidth) is properly set according to a status in the receiving side.

[Patent document 1] Japanese Laid-Open Patent Application No.2002-204278

[Patent document 2] Japanese Laid-Open Patent Application No. 2002-325095

SUMMARY OF THE INVENTION

However, in many cases, a terminal transmitting the real-time media to a mobile terminal is one (especially, a fixed terminal) connected to a network, and the terminal is connected to the network so as to distribute the real-time media not only to a particular receiver but to various receivers. Therefore, as shown in the patent document 1 and the patent document 2, to change transmission rate and the like according to the communication environment of the particular receiver at each time makes control complicated and inconvenient as the number of terminals that perform data communication with the terminal increase. This means that data transmission efficiency of the system as a whole degrades.

In addition, in a wireless section, transmission parameters (number of packet retransmissions, packet priority, error correction level and the like) for determining a wireless communication scheme are adjusted so as to enhance wireless communication quality such as receive power, signal to noise ratio (S/N), and frame error rate (FER). However, since signal transmission schemes (packet frame configuration, for example) between the wireless section and a cable section are different, enhancing the wireless communication quality does not necessarily directly enhance the transmission quality of the real-time media. Therefore, in the conventional transmission system including the wireless section, there is fear that the transmission quality of the real-time media is not properly maintained.

On the other hand, when a target value of the transmission quality of the real-time media is set to be excessively high, redundant communication resources and calculation load become necessary to achieve the target high quality, so that it may exert bad effects to the data transmission efficiency of the whole system. Therefore, it becomes important to set the quality parameters properly.

The present invention is contrived to solve at least one of the problems, and an object of the present invention is to provide a transmission parameter control apparatus that can improve the transmission quality of the real-time media in the transmission route that includes the wireless section in at least a part of the transmission route.

The object is achieved by means described as follows. According to the present invention, a transmission parameter control apparatus that is connected to a terminal via a network and that is connected to a mobile terminal via a wireless link is provided. This apparatus includes an obtaining part for obtaining a quality parameter indicating transmission quality corresponding to the wireless link, and an adjustment part for adjusting a transmission parameter value for determining a transmission scheme in the wireless link according to the obtained quality parameter.

BRIEF DESCRIPTION OF THE DRAWINGS

FIG. 5 shows a table indicating mutual relationship between a quality parameter and transmission parameters;

FIG. 8 shows a table indicating mutual relationship between a quality parameter and transmission parameters;

FIG. 11 shows a table indicating mutual relationship between a quality parameter and transmission parameters;

DETAILED DESCRIPTION OF THE PREFERRED EMBODIMENTS

Figure 1:
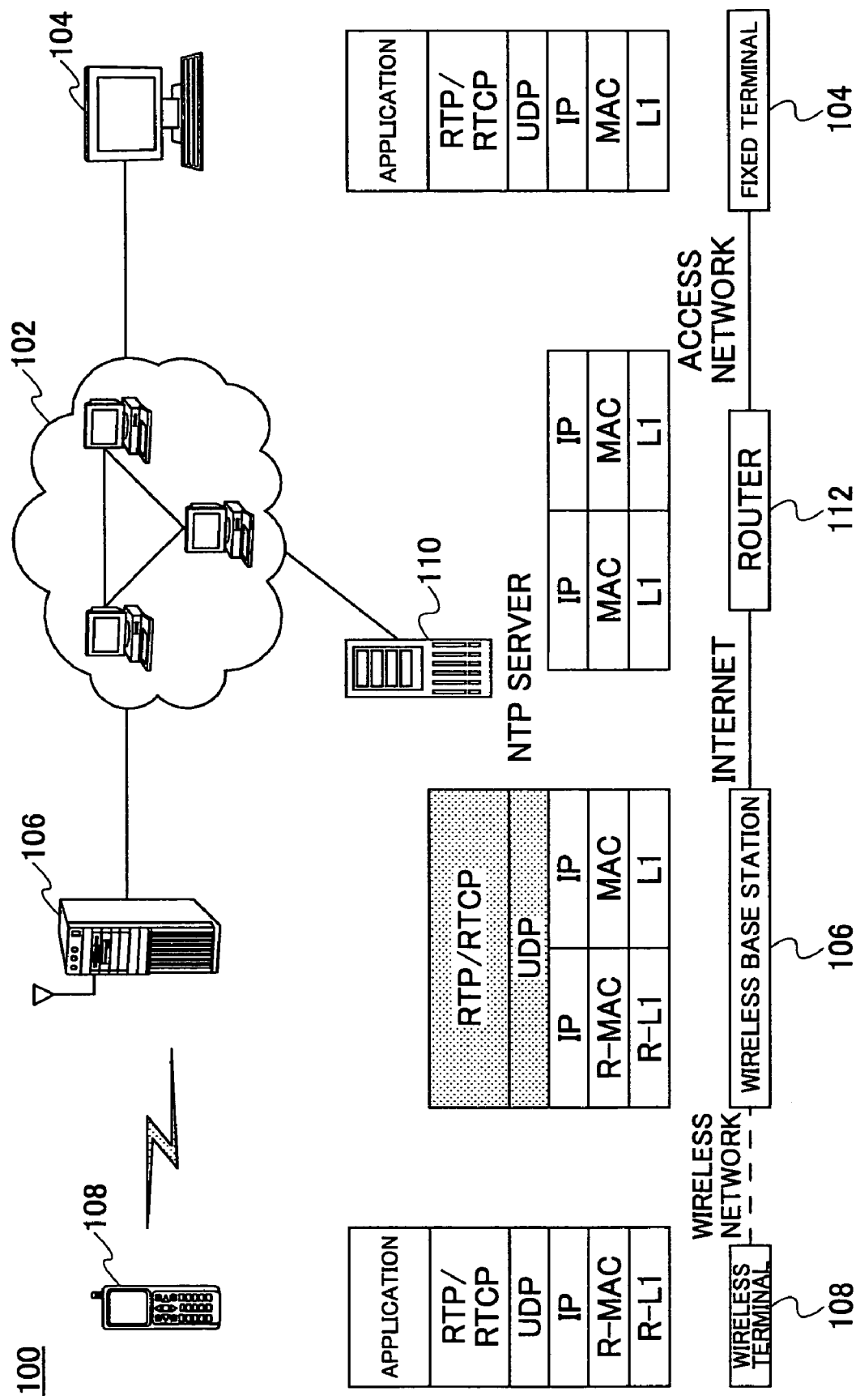
FIG. 1 is a figure showing a communication system performing real-time media streaming in an embodiment of this application.

FIG. 1 shows a communication system performing real-time media streaming in an embodiment of this application. Generally, components appearing in FIG. 1 have reference numbers starting with "1". The communication system 100 includes a fixed terminal 104 connected to a network, and the fixed terminal 104 distributes real-time media such as voice or video data. The communication system 100 includes one or more wireless base station 106. The wireless base station 106 can communicate with the mobile terminal 108 via a wireless link. The mobile terminal 108 is an apparatus conforming to RTP/RTCP, such as a portable telephone, a personal computer, a PDA and the like. Although only one wireless base station 106 and one mobile terminal 108 are shown for the sake of simplicity, a plurality of these may exist actually. Further, the communication system 100 includes an NTP (Network Time Protocol) server 110. The NTP server 110 distributes a reference time for causing the various communication components on the network to be synchronized with each other.

A general outline of operation is described as follows. The real-time media (video data, for example) are packetized for cable communications in the fixed terminal 104 and are distributed over the network 102. The router 112 in the network 102 searches for and determines a route of the packet and performs proper relaying operation. The wireless base station 106 that receives the packet converts the packet into a wireless packet for wireless communications, and transmits the wireless packet to the mobile terminal 108 by wireless. The mobile terminal 108 reproduces desired video data from the received wireless packet. By the way, data distribution in the reverse direction is performed as necessary.

FIG. 1 also shows protocol layers in each communication component. In the following, an outline of each layer is described in order beginning with a low layer.

L1 indicates a protocol layer for signal transmission between the fixed terminal and the wireless base station. R-L1 indicates a protocol layer for signal transmission between the mobile terminal and the wireless base station. MAC indicates a protocol layer that controls the physical layer and the like between the fixed terminal and the wireless base station. R-MAC indicates a protocol layer controlling the physical layer and the like between the mobile terminal and the wireless base station.

IP indicates a protocol layer for performing packet distribution on the Internet. UDP indicates a user datagram protocol layer. RTP/RTCP indicates a protocol layer for performing real-time transmission and control for video data and the like. APPLICATION indicates a protocol layer for converting video to data or data to video.

Different from a conventional communication system, in the communication system 100 of the present embodiment, processing on the layers of RTP/RTCP and UDP is performed not only in the fixed terminal 104 and the mobile terminal 108 but also in the wireless base station 106.

Figure 2:
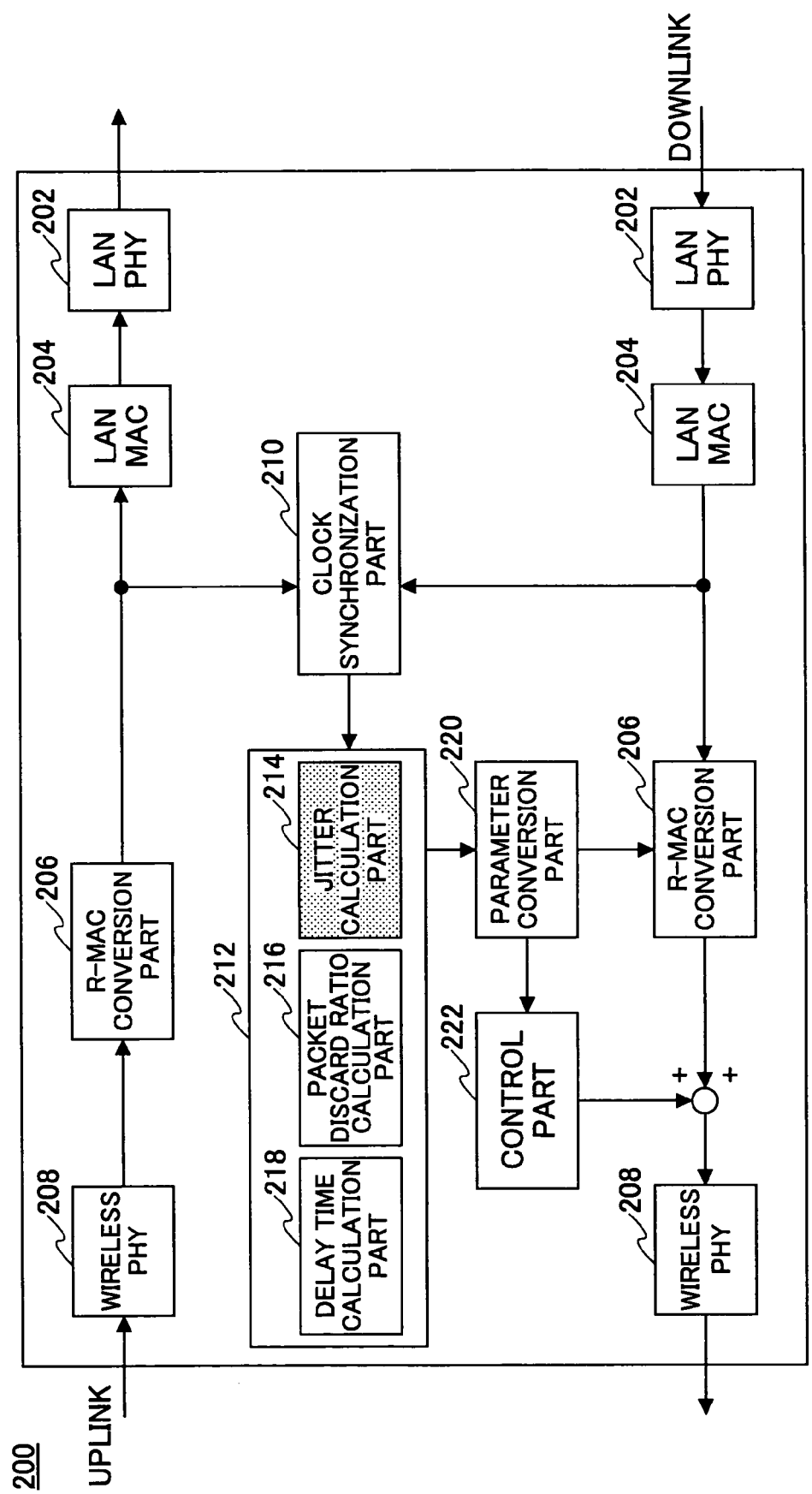
FIG. 2 is a figure showing a functional block diagram of a transmission parameter control apparatus in an embodiment of this application.

FIG. 2 shows a functional block diagram of a transmission parameter control apparatus according to the present embodiment. Generally, components appearing in FIG. 2 have reference numbers starting with "2". It is assumed that the transmission parameter control apparatus 200 is provided in the wireless base station 106 for the sake of simplicity. But, the configuration is not limited to this. The transmission parameter control apparatus 200 can be provided in an apparatus higher than the wireless base station, or can be provided in each sector that forms a cell.

The transmission parameter control apparatus 200 adjusts transmission parameters (number of packet retransmissions, packet priority, error correction level and the like) for determining a transmission scheme in the wireless section by using signals in a downlink transmission route from the fixed terminal 104 to the mobile terminal 108 and in an uplink transmission route from the mobile terminal 108 to the fixed terminal 104. In this embodiment, the transmission parameter control apparatus 200 is provided in the wireless base station connected to a local area network (LAN). Therefore, a process component (PHY) 202 for the physical layer and a process component (LAN MAC) 204 for the MAC layer for LAN, and a process component (R-MAC conversion part) 206 for the MAC layer and a process component (wireless PHY) 208 for the physical layer for wireless communication, are provided in each of the uplink and downlink transmission routes.

The transmission parameter control apparatus 200 includes a clock synchronization part (extraction part) 210, which extracts information on time from a signal on the downlink or downlink transmission route so as to cause each component in the transmission parameter control apparatus 200 to be synchronized with a proper timing. As mentioned later, the information on time is a time stamp, sequence number or the like included in the packet. The transmission parameter control apparatus 200 includes a measurement part 212. The measurement part 212 measures quality parameters indicating transmission quality of real-time media. There are Various quality parameters, and the quality parameters are calculated by components in the measurement part 212. For example, a jitter indicating fluctuations of packet transmission time is measured or calculated by a jitter calculation part 214. A packet discard ratio indicating a ratio of packets, in transmitted packets, that are not properly received so as to be discarded is measured or calculated by the packet discard ratio calculation part 216. Delay (delay time) of the packet transmission time is measured or calculated by the delay time calculation part 218. In the present embodiment, the apparatus operates so as to obtain all quality parameters of the jitter, packet discard ratio and delay time. However, depending on uses, one or a combination of a plurality of these can be used.

The transmission parameter apparatus includes a parameter conversion part 220. This adjusts transmission parameters for determining the wireless communication scheme for communicating with the mobile terminal based on the quality parameters calculated in the measurement part 212. The transmission parameters may include a number of retransmissions of wireless packets, priority of wireless packets and an error correction coding level, for example. As described later, relationship between the quality parameter such as the jitter and the transmission parameter such as the number of retransmissions is determined according to a predetermined list or table. Concrete adjustment or setting of the transmission parameter is performed in the MAC layer on wireless communications (R-MAC conversion part). The transmission parameter control apparatus 200 includes a control part 222. This is, when the transmission parameter such as the number of retransmissions is changed, for reporting that the transmission parameter in wireless communications is changed to the mobile terminal 108 via a wireless packet (more particularly, a part of individual control information in RTCP packet) on the downlink transmission route.

Figure 3:
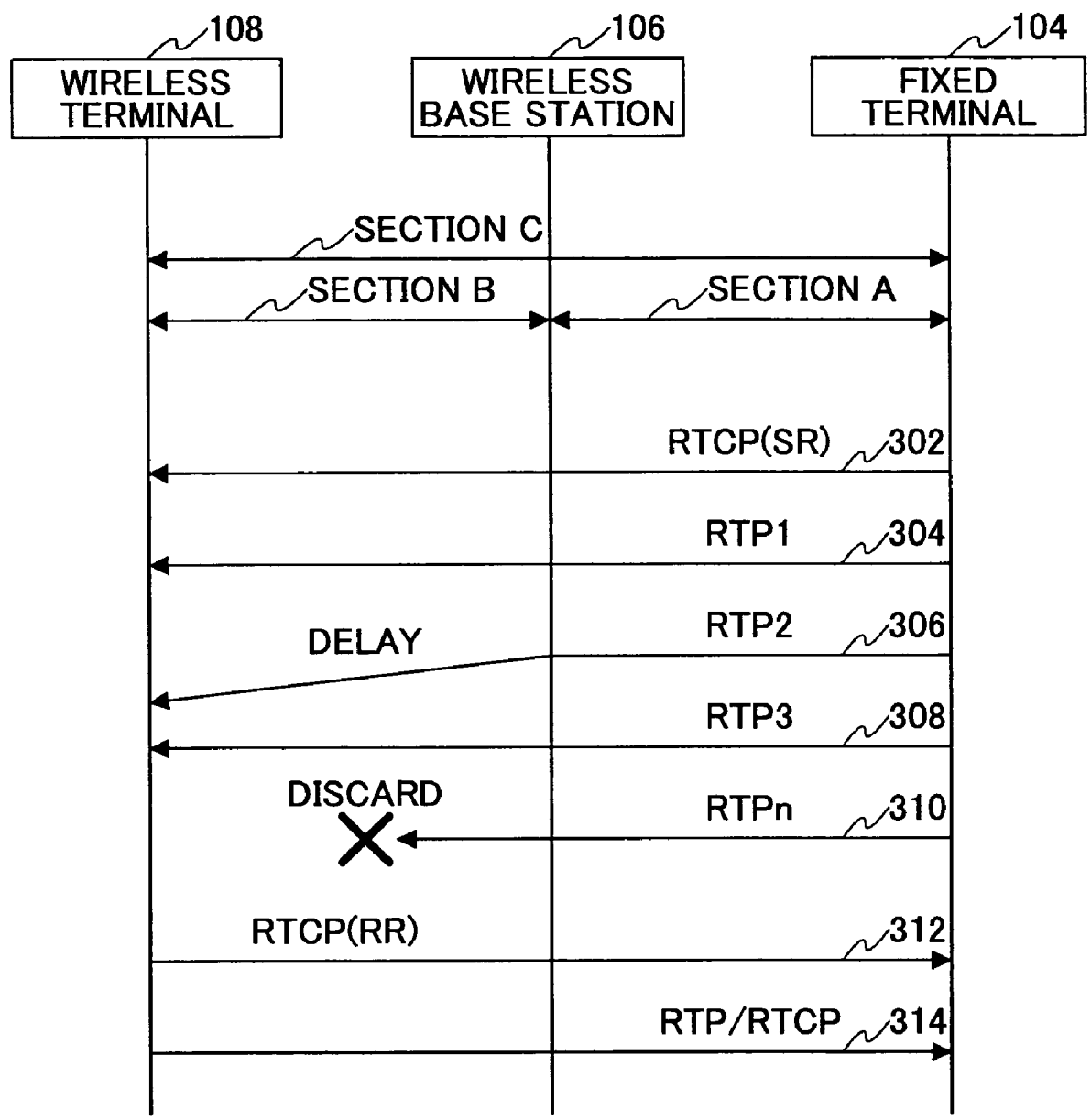
FIG. 3 is a figure showing a signal transmission sequence in an embodiment of this application.

FIG. 3 shows an example of a signal transmission sequence in the present embodiment. In this example, video data are transmitted from the fixed terminal 104 to the mobile terminal 108 (in a downlink direction). For convenience of explanation, it is assumed that a cable communication section from the fixed terminal 104 to the wireless base station 106 is a section A, and that a wireless communication section from the wireless base station 106 to the mobile terminal 108 is a section B, and that the whole section between the fixed terminal 104 and the mobile terminal 108 is a section C. Reference numbers 302-314 indicate signal transmission at various time points in uplink or downlink.

As shown by the reference number 302, first, an RTCP packet is transmitted from the fixed terminal 104. Generally, the RTCP packet includes a header part and a part of individual control information. Especially, the RTCP packet transmitted at this time point includes information called sender report (SR) in its header, in which the sender report is report information from a sender side to a receiver side. The sender report (SR) includes information such as (a) NTP time stamp, (b) RTP time stamp, (c) number of transmission packets, (d) number of transmission bytes, for example.

(a) The NTP time stamp indicates an absolute time (global standard time, for example) when information is transmitted from the sender (fixed terminal 104) side.

(b) The RTP time stamp indicates an RTP time stamp at the time when information is transmitted from the sender side. The RTP time stamp indicates time (sampling time of header data) incremented from an initial value by one for each sampling period. Generally, the RTP time stamp indicates a time relating to real-time media and the NTP time stamp indicates a reference time timed separately from the real-time media.

(c) The number of transmission packets indicates a total number of RTP packets transmitted until the information (packet) of the sender side is generated.

(d) The number of transmission bytes indicates a cumulative amount of payload of the RTP packets transmitted until the information of the sender side is generated.

The RTCP packet indicated by the reference number 302 branches off and is supplied to the clock synchronization part 210 in the transmission parameter control apparatus 200 in the wireless base station 106. The clock synchronization part 210 extracts the NTP time stamp from the RTCP packet (SR) so as to synchronize the apparatus with a reference time, and extracts the RTP time stamp and supply it to the measurement part 212.

As shown by the reference numbers 304-310, the RTP packets are transmitted over the downlink transmission route in order. Depending on concrete communication status or communication environment, a packet arrives with a delay, and another packet may be discarded. Each RTP packet includes header information and payload corresponding to contents of video data. The predetermined header information includes (a) a sequence number and (b) an RTP time stamp, for example.

(a) The sequence number is a number indicating transmission order of packets and the initial value is determined randomly. The sequence number increases by 1 each time when one packet is transmitted, and is represented by 16 bits, for example.

(b) The RTP time stamp indicates a sampling time of the header data, and the initial value is determined randomly. The RTP time stamp is incremented by one for each sampling period. For example, when performing sampling in 8 kHz in pulse code modulation (PCM), one count-up is performed each 125 μs.

Each of the RTP packets is also introduced into the clock synchronization part 210 and the sequence number and the RTP time stamp are extracted. Information extracted in the clock synchronization part 210 is provided to each component (the jitter calculation part 214, the packet discard ratio calculation part 16, the delay time calculation part 218) in the measurement part 212, so that the jitter, the packet discard ratio and the delay time are calculated. More particularly, each of the RTP packet can be identified and the order can be ascertained using a series of the sequence numbers. Then, by comparing each RTP time stamp with an arriving time (can be obtained by the clock synchronization part 220) when the transmission parameter control apparatus receives the RTP packet, the delay time of each RTP packet can be ascertained. By checking the length of the delay time of a plurality of RTP packets, the fluctuations, namely, the jitter can be calculated. In addition, by checking continuity of the sequence number, the packet discard ratio can be calculated, As to measurement or calculation performed in the measurement part 212, not only such direct method but also other arbitrary method using information included in the header of the RTP packet can be used.

As to the signal transmission indicated by the reference numbers 302-310, by measuring the quality parameters in the wireless base station 106 in the above-mentioned way, the quality parameters in the cable communication section (section A) between the fixed terminal 104 and the wireless base station 106 can be obtained.

Next, as indicated by the reference number 312, the RTCP packet is transmitted from the mobile terminal 108. The RTCP packet transmitted at this time point includes information called receiver report (RR). The receiver report is report information from the receiver side to the sender side. The receiver report (RR) includes (a) SSRC-n, (b) packet discard ratio, (c) total number of cumulative packets, (d) sequence number, (e) jitter of arriving time, (f) SR time stamp, (g) SR delay, and the like, for example. As a precondition of the present embodiment, it is required that the mobile terminal 108 can perform operation conforming to the RTP/RTCP protocol.

(a) The SSRC-n indicates an identifier for identifying a target for report, that is, a sender (fixed terminal 104) of the RTCP (SR). In this embodiment, the target for the report is only the fixed terminal 104, but generally, there are a plurality of targets of the report. In such a case, each target is identified by SSRC-1, SSRC-2, ..., and SSRC-N, in which amounts on the items (b)-(g) are reported for each SSRC-n.

(b) The packet discard ratio indicates RTP packet discard ratio after previous reporting.

(c) The cumulative total number of packets indicates the total number of packets after receiving a RTP packet.

(d) The sequence number (sequence number in this report) indicates a newest RTP sequence number.

(e) The jitter of arriving time indicates a jitter estimation value for packet arriving intervals.

(f) The SR time stamp indicates an NTP time stamp (16-47 bits in NTP) reported by the sender report (SR).

(g) The SR delay indicates elapsed time from the time when receiving the sender report (SR) to the time when sending receiver report (RR).

When the RTCP (RR) including the above information is received by the wireless base station 106, the signal is supplied to the clock synchronization part 210 via a branch route, and various information in the receiver report (RR) are extracted. The extracted information are supplied to the measurement part 212. The quality parameter of the real-time media in the information indicates a value for the whole section C from the fixed terminal 104 to the mobile terminal 108. Thus, for example, the jitter calculation part 214 compares a value of jitter for the whole section C with a value of jitter for the section A previously obtained (obtains difference between them), so that a jitter for the section B (=section C−section A) can be obtained. In the same way, the packet discard ratio and the delay time for the wireless communication section in the section B can be obtained. Accordingly, quality parameters of the real-time media for the section B can be obtained in the measurement part 212. The measurement result of the quality parameters is supplied to the parameter conversion part 220.

In the parameter conversion part 220, it is determined how the transmission parameters for determining the wireless transmission scheme are to be adjusted based on the measurement result of the quality parameters. This determination can be performed based on a table, for example. The determined transmission parameters are set in the R-MAC conversion part 206, and are used for communications hereinafter. In this process, it is necessary to report, to the mobile terminal 108, that the change or update of the transmission parameter has been performed. In this regard, the control part 222 writes the change information of the parameters into the downlink control channel (individual control information part of the RTCP packet, for example) so as to be able to report the information.

Figure 4:
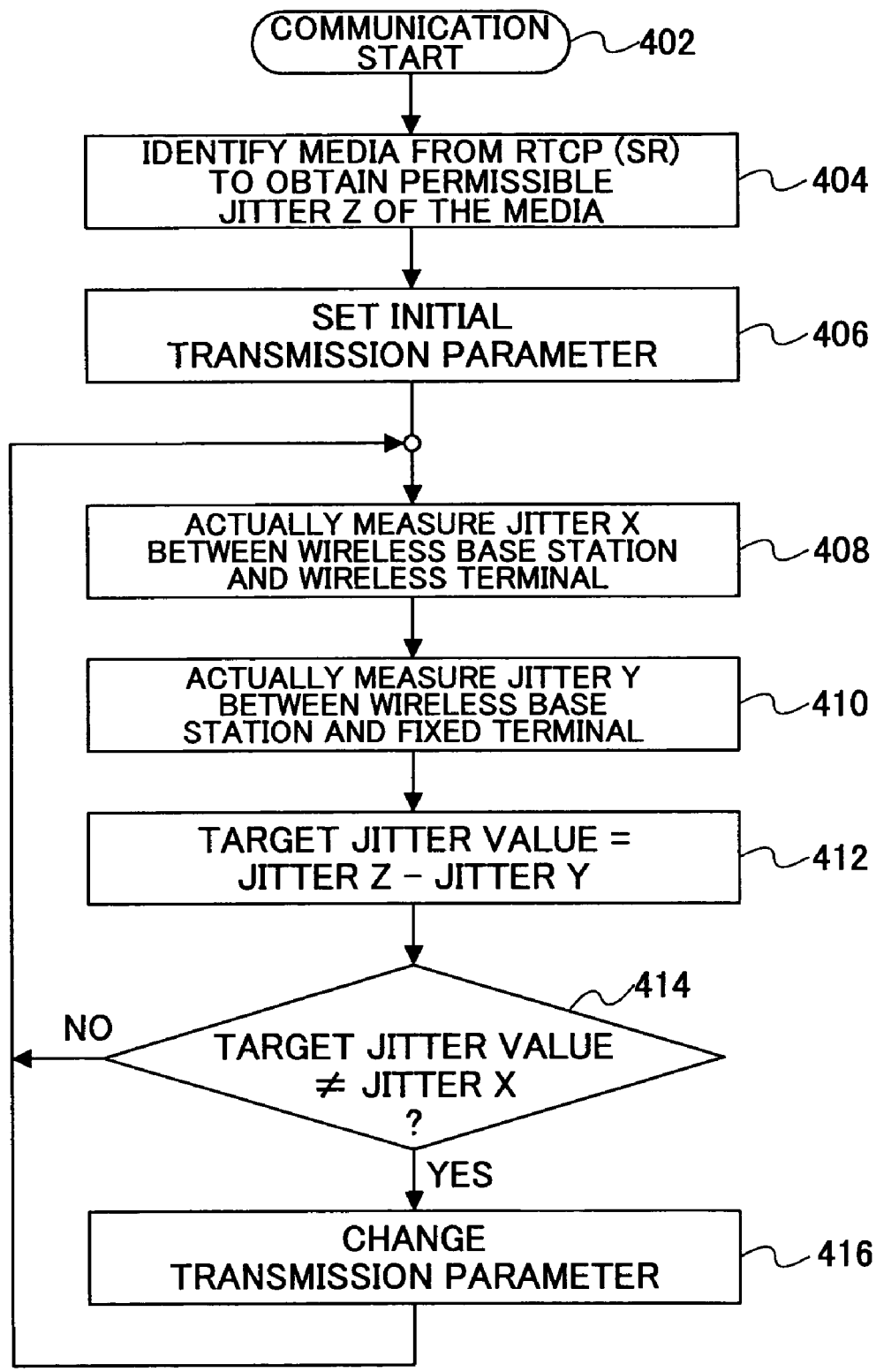
FIG. 4 shows a flowchart indicating an operation example of the transmission parameter control apparatus in an embodiment of this application.

FIG. 4 shows a flowchart indicating main operation of the transmission parameter control apparatus 200 in the present embodiment. The flow 400 starts with step 402 when communication starts, and goes to step 402.

In step 404, real-time media that are a transmission object are identified based on information included in the RTCP (SR), so as to obtain a permissible jitter Z of the real-time media. The permissible jitter is a maximum value of fluctuations of delay time, and is permissible even though occurs when reproducing the real-time media, and the value is ±30 ms, for example.

In step 406, an initial transmission parameter is set. For example, a number of retransmissions of wireless packets when performing wireless communications is set to be 2.

In step 408, a jitter X between the wireless base station and the mobile terminal (section B) is measured.

In step 410, a jitter Y between the wireless base station and the fixed terminal (section A) is measured.

In step 412, a difference of the permissible jitter Z and the jitter Y for the section A is set to be a target jitter value.

In step 414, it is determined whether the target jitter Y is the same as the jitter X for the section B. When they are the same (when NO), the flow 400 returns back to the step 408, so that each measurement step is repeated. When they are not the same (Yes), the flow goes to the step 416.

In step 416, the transmission parameter such as the number of retransmissions is adjusted such that the jitter X comes close to the target jitter. Then, returning back to the step 408, communications that use the updated transmission parameter are performed. The adjustment performed in the step 416 can be performed based on a table prepared beforehand, for example.

FIG. 5 shows a table indicating mutual relationship between the jitter, and the number of retransmissions and the transmission priority. For example, for decreasing the jitter in the wireless communication section when it is a large value, it is effective to decrease the number of retransmissions of the wireless packet. The reason is that, as the number of retransmissions decreases, residence time of the wireless packet decreases, so that delay time, and the jitter that is fluctuation of the delay time may decrease. In addition, to decrease the jitter, it is also effective to heighten the transmission priority. The reason is that, by heightening the priority, residence time of the wireless packet can be decreased. By the way, as the jitter decreases, the delay time also decreases, but the packet discard ratio increases.

Inversely, a case when the value of the jitter in the wireless communication section B is small is considered. Since fluctuations of the delay time in packet communications are small in this case, this case is preferable from the viewpoint of the quality of the real-time media. However, occurrence of a more-than-necessary small jitter in wireless communications with a mobile terminal means that communication resources are consumed more than necessary in the wireless communications. The communication capacity is reduced by the excessively consumed communication resources, which is disadvantageous for the system as a whole. Therefore, when the jitter is small more than necessary, it is meaningful to increase the jitter. For example, the number of retransmission of the wireless packet is increased. When the number of the retransmissions becomes large, the residence time of the wireless packet becomes long so that the delay time and the jitter that is fluctuations of the delay time may increase. In addition, for increasing the jitter, it is also effective to lessen the transmission priority. This is because, by lessening the priority, the residence time of the wireless packet can be increased. By the way, as the jitter increase, the delay time also increases, but the packet discard ratio decreases.

In the above description, for the sake of simplicity, each of the quality parameter and the transmission parameter is classified to two alternatives such as large-small, many-few, and high-low. But, it can be classified to more cases. For example, it may be classified to three stages of small, medium and large, or more so as to generate a table.

In the flowchart shown in FIG. 4, the transmission parameter in the wireless section is adjusted such that the jitter in the whole section falls within a range of the permissible jitter of the real-time media. In this flowchart, jitter variation in the cable communication section A is compensated by changing the jitter in the wireless communication section B, such that the jitter (permissible jitter value) in the whole section C becomes constant. Therefore, when a measurement value of the jitter in the cable communication section A already exceeds the permissible jitter, the compensation of the present embodiment cannot be performed.

Figure 6:
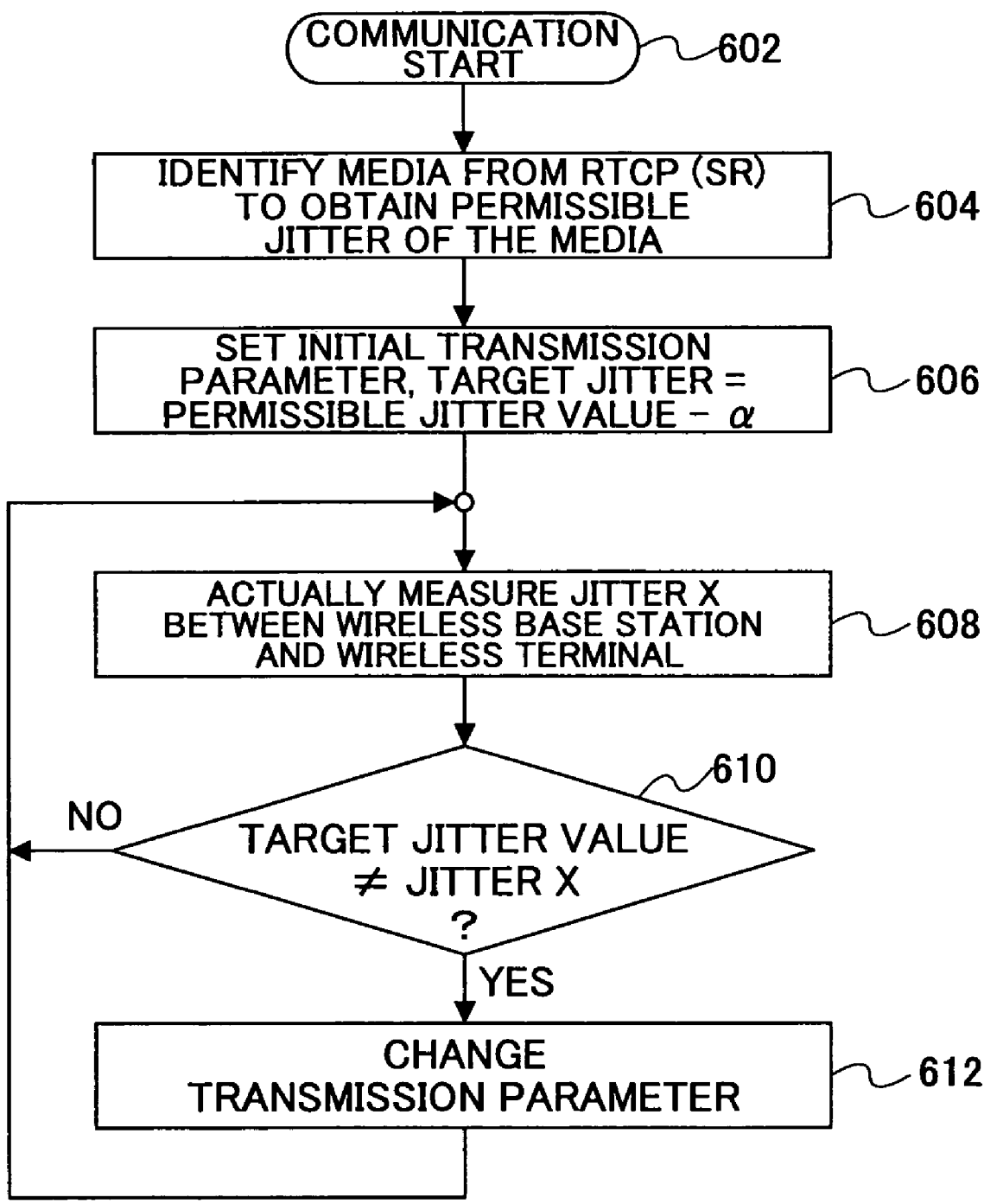
FIG. 6 shows a flowchart indicating an operation example of the transmission parameter control apparatus in an embodiment of this application.

FIG. 6 shows a flowchart showing another operation of the transmission parameter control apparatus 200 in the present embodiment. The flow 600 starts with step 602 when communication starts, and goes to step 604.

In step 604, real-time media that are a transmission object are identified based on information included in the RTCP (SR), so as to obtain a permissible jitter Z of the real-time media. The permissible jitter is a maximum value of fluctuations of delay time, and is permissible even though occurs when reproducing the real-time media, and the value is ±30 ms, for example.

In step 606, an initial transmission parameter is set. For example, a number of retransmissions of the wireless packet when performing wireless communications is set to be 2. In addition, a target value is set by subtracting a value α from the permissible jitter. The value α is a value (≦permissible jitter value) that is worst in measured jitters between the wireless base station and the fixed terminal (section A).

In step 608, a jitter X between the wireless base station and the mobile terminal (section B) is measured.

In step 610, it is determined whether the target jitter Y is the same as the jitter X for the section B. When they are the same (when No), the flow 600 returns back to the step 608, and the measurement step is repeated. When they are not the same (Yes), the flow 600 goes to the step 612.

In step 612, the transmission parameter such as the number of retransmissions is adjusted such that the jitter X comes close to the target jitter. Then, returning back to the step 608, communications that use the updated transmission parameter are performed. The adjustment performed in the step 612 can be performed in the above-mentioned way (FIG. 5).

Figure 7:
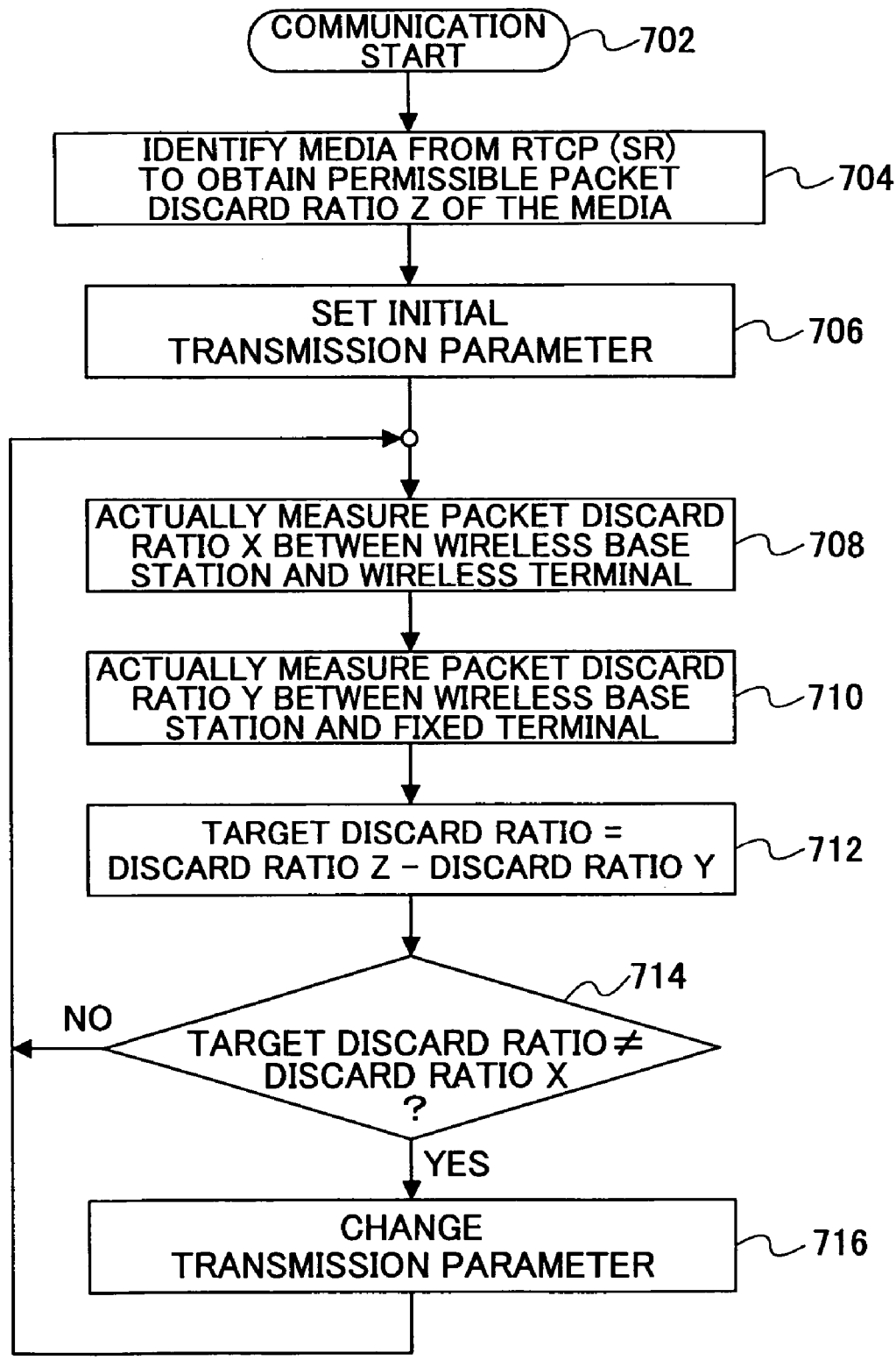
FIG. 7 shows a flowchart indicating an operation example of the transmission parameter control apparatus in an embodiment of this application.

According to this flow, instead of measuring the jitter for the cable communication section A at each time, the value is represented as (fixed to) the worst value α, so that the transmission parameter of the wireless section is adjusted such that the sum of the worst value α and the jitter X in the wireless communication section B falls within the permissible jitter of the real-time media. According to this embodiment, since a difference between the permissible jitter value and the worst value α is almost constant (it can be estimated that the worst value is not frequently updated), feedback control is performed such that the jitter X for the section B becomes constant FIG. 7 shows a flowchart indicating another operation of the transmission parameter control apparatus 200 in the present embodiment. This embodiment is similar to the flow 400 shown in FIG. 4 except that the packet discard ratio instead of the jitter is measured or calculated. The flow 700 starts with step 702 when communication starts, and goes to step 704.

In step 704, real-time media that are a transmission object are identified based on information included in the RTCP (SR), so as to obtain a permissible packet discard ratio Z of the real-time media. The permissible packet discard ratio is a maximum value of the packet discard ratio that is permissible even though the packet discard ratio occurs when reproducing the real-time media, and the value is 1.0%, for example.

In step 706, an initial transmission parameter is set.

In step 708, a packet discard ratio X between the wireless base station and the mobile terminal (section B) is measured.

In step 710, a packet discard ratio Y between the wireless base station and the fixed terminal (section A) is measured.

In step 712, a difference between the permissible packet discard ratio Z and the packet discard ratio Y for the section A is set to be a target jitter value.

In step 714, it is determined whether the target packet discard ratio Y is the same as the packet discard ratio X for the section B. When they are the same (when NO), the flow 700 returns back to the step 708, so that each measurement step is repeated. When they are not the same (Yes), the flow goes to the step 716.

In step 716, the transmission parameter such as the number of the retransmissions is adjusted such that the packet discard ratio X comes close to the target discard ratio. Then, returning back to the step 708, communications that use the updated transmission parameter are performed. The adjustment performed in the step 716 can be performed based on a table prepared beforehand, for example.

FIG. 8 shows a table indicating mutual relationship between the packet discard ratio, and the number of retransmissions and the error correction level. For example, for decreasing the packet discard ratio when it is a large value, it is effective to increase the number of retransmissions of the wireless packet. The reason is that, as the number of retransmissions increases, arrival factor of the wireless packet rises, so that the discard ratio decreases. In addition, to decrease the large packet discard ratio, it is also effective to heighten the order of the error correction level. The reason is that, by heightening the order of the error correction level, reproduction ratio of data increases, so that the packet discard ratio can be decreased. By the way, as the packet discard ratio decreases, processing time increases, so that the delay time also increases.

Inversely, a case when the value of the packet discard ratio in the wireless communication section B is small is considered. This case is also preferable from the viewpoint of the quality of the real-time media. However, occurrence of packet discard ratio that is more than necessary small in wireless communications with a mobile terminal means that communication resources are consumed more than necessary in the wireless communications, which exerts bad effects on the resource consumption efficiency. Therefore, when the packet discard ratio is small more than necessary, it is meaningful to increase the packet discard ratio. For example, the number of retransmission of the wireless packet is decreased. Accordingly, the arrival factor of the wireless packet is lessened and the packet discard ratio becomes large. In addition, for increasing the packet discard ratio, it is also effective to lessen the error correction level. This is because, by lessening the error correction level, the reproduction ratio of data is reduced, so that the packet discard ratio increases. By the way, as the packet discard ratio increases, the delay time is shortened.

In the flowchart shown in FIG. 7, the transmission parameter in the wireless section is adjusted such that the packet discard ratio in the whole section falls within a range of the permissible packet discard ratio of the real-time media. In this flowchart, variation of the packet discard ratio in the cable communication section A is compensated by changing the packet discard ratio in the wireless communication section B, so that the jitter (permissible jitter value) in the whole section C becomes constant.

Figure 9:
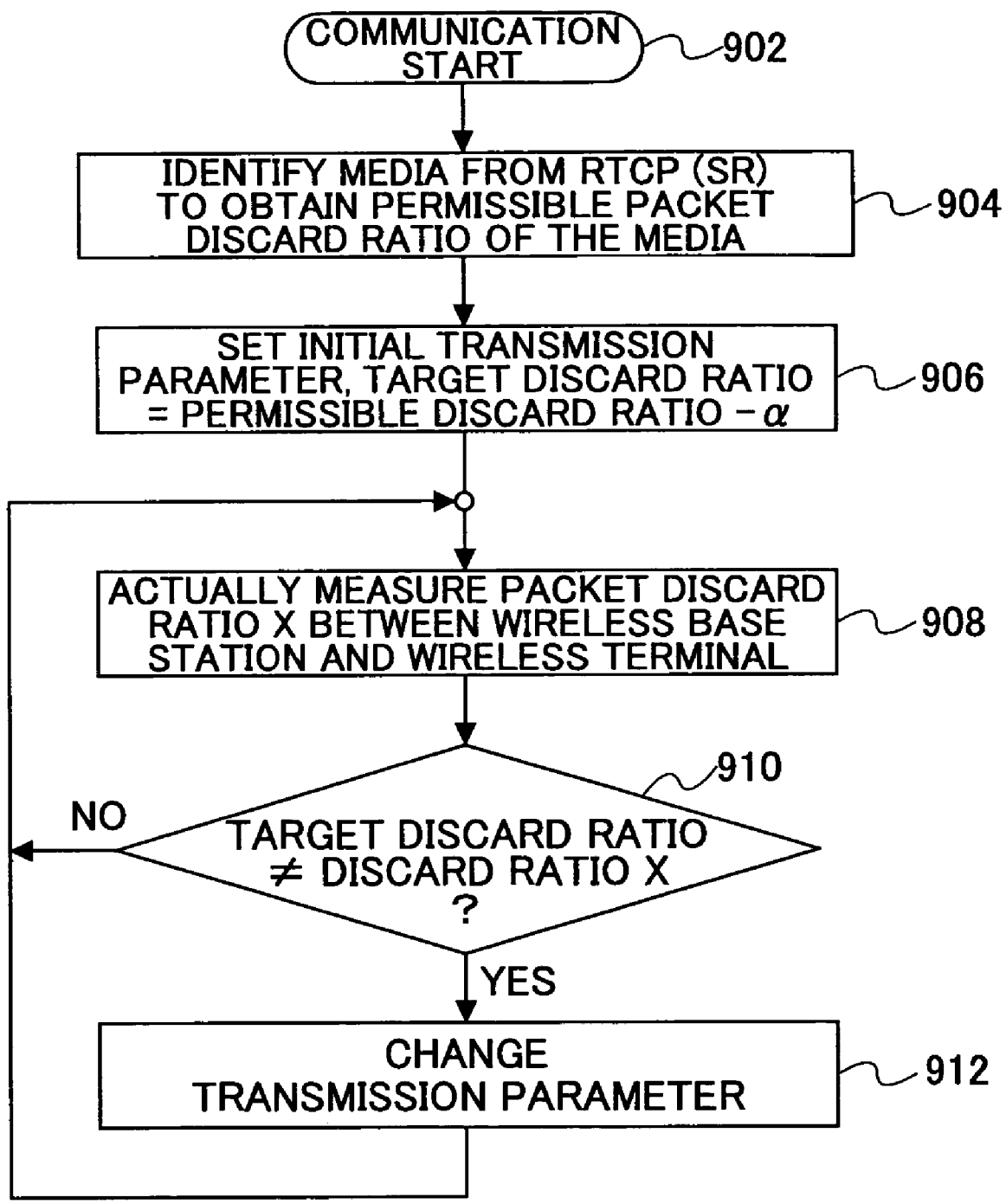
FIG. 9 shows a flowchart indicating an operation example of the transmission parameter control apparatus in an embodiment of this application.

FIG. 9 shows a flowchart showing another operation of the transmission parameter control apparatus 200 in the present invention. The flow 900 is similar to the flow 600 shown in FIG. 6 except that a packet discard ratio instead of the jitter is obtained. The flow 900 starts with step 902 when communication starts, and goes to step 904.

In step 904, real-time media that are a transmission object are identified based on information included in the RTCP (SR), so as to obtain a permissible packet discard ratio of the real-time media.

In step 906, an initial transmission parameter is set. In addition, a target discard ratio is set by subtracting a value α from the permissible packet discard ratio. The value α is a value (≦permissible jitter value) that is worst in measured packet discard ratios between the wireless base station and the fixed terminal (section A).

In step 908, a packet discard ratio X between the wireless base station and the mobile terminal (section B) is measured.

In step 910, it is determined whether the target discard ratio is the same as the packet discard ratio X for the section B. When they are the same (when No), the flow 900 returns back to the step 908, and the measurement step is repeated. When they are not the same (Yes), the flow 900 goes to the step 912.

In step 912, the transmission parameter such as the number of retransmissions is adjusted such that the packet discard ratio X comes close to the target discard ratio. Then, returning back to the step 908, communications that use the updated transmission parameter are performed. The adjustment performed in the step 912 can be performed in the above-mentioned way (FIG. 8).

According to this flow, instead of measuring the packet discard ratio for the cable communication section A at each time, the value is represented as (fixed to) the worst value α, so that the transmission parameter of the wireless section is adjusted such that the sum of the worst value α and the packet discard ratio X in the wireless communication section B falls within the permissible packet discard ratio of the real-time media. According to this embodiment, since a difference between the permissible packet discard ratio and the worst value α is almost constant (it is assumed that the worst value is not frequently updated), feedback control is performed such that the packet discard ratio X in the section B becomes constant.

Figure 10:
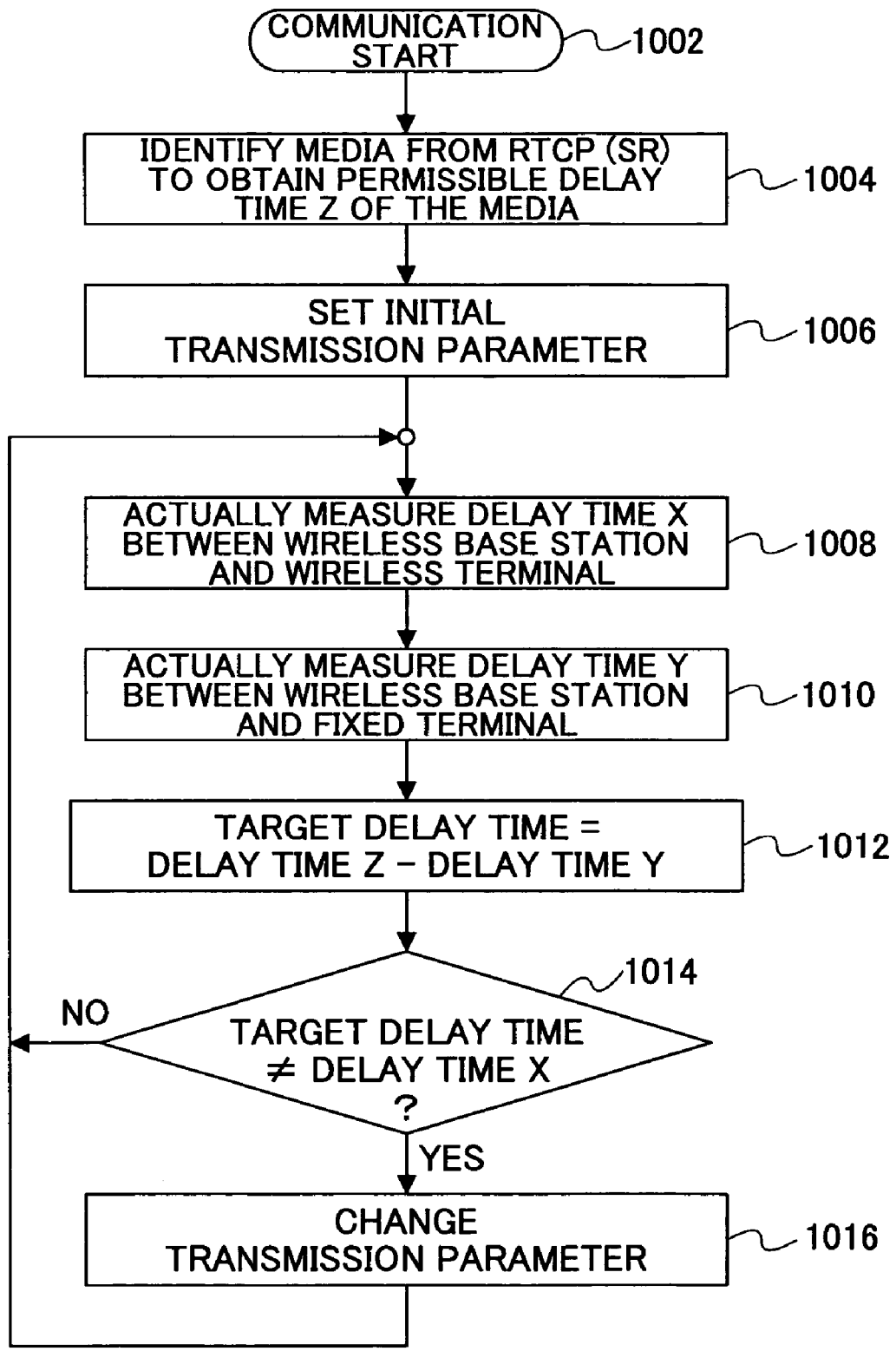
FIG. 10 shows a flowchart indicating an operation example of the transmission parameter control apparatus in an embodiment of this application.

FIG. 10 shows a flowchart indicating another operation of the transmission parameter control apparatus 200 in the present embodiment. This embodiment is similar to the flow 400 shown in FIG. 4 except that a delay time instead of the jitter is measured or calculated. The flow 1000 starts with step 1002 when communication starts, and goes to step 1004.

In step 1004, real-time media that are a transmission object are identified based on information included in the RTCP (SR), so as to obtain a permissible delay time Z of the real-time media. The permissible delay time is a maximum value of the delay time that is permissible even though occurs when reproducing the real-time media, and the value is 100 ms, for example.

In step 1006, an initial transmission parameter is set.

In step 1008, a delay time X between the wireless base station and the mobile terminal (section B) is measured.

In step 1010, a delay time Y between the wireless base station and the fixed terminal (section A) is measured.

In step 1012, a difference between the permissible delay time Z and the delay time Y for the section A is set to be a target delay time.

In step 1014, it is determined whether the target delay time is the same as the delay time X for the section B. When they are the same (when NO), the flow 1000 returns back to the step 1008, so that each measurement step is repeated. When they are not the same (Yes), the flow goes to the step 1016.

In step 1016, the transmission parameter such as the number of retransmissions is adjusted such that the delay time X comes close to the target delay time. Then, returning back to the step 1008, communications that use the updated transmission parameter ate performed. The adjustment performed in the step 1016 can be performed based on a table prepared beforehand, for example.

FIG. 11 shows a table indicating mutual relationship between the delay time, and, the number of retransmissions, the error correction level and the transmission priority. For example, for decreasing the delay time when it is a large value, it is effective to decrease the number of retransmissions of the wireless packet. The reason is that, as the number of retransmissions decreases, residence time of the wireless packet is shortened, so that the delay time decreases. When the error correction level is set to be low order, since required processing time decreases, the delay time can be lessened. In addition, when the transmission priority is heightened, since the residence time of the wireless packet is shortened, the delay time is also shortened. By the way, as the delay time decreases, the jitter decreases, but the packet discard ratio increases.

Inversely, a case when the value of the delay time in the wireless communication section B is small is considered. This case is preferable from the viewpoint of the quality of the real-time media. However, occurrence of a delay time that is more than necessary small in wireless communications with a mobile terminal means that communication resources are consumed more than necessary in the wireless communications. This is disadvantageous for the system as a whole.

Therefore, when the jitter is small more than necessary, it is meaningful to increase it. For example, by increasing the number of retransmissions, residence time of the wireless packet increases, so that the delay time increases. By setting the error correction level to be high order, required processing time increases, so that the delay time can be increased. In addition, by lessening the transmission priority, the residence time of the wireless packet increases, so that the delay time can be increased. By the way, as the delay time increases, the jitter also increases. But, the packet discard ratio is lowered.

In the flowchart shown in FIG. 10, the transmission parameter in the wireless section is adjusted such that the delay time in the whole section falls within a range of the permissible delay time of the real-time media. In this flowchart, variation of the delay time in the cable communication section A is compensated by changing the delay time in the wireless communication section B, so that the delay time (permissible delay time) in the whole section C becomes constant.

Figure 12:
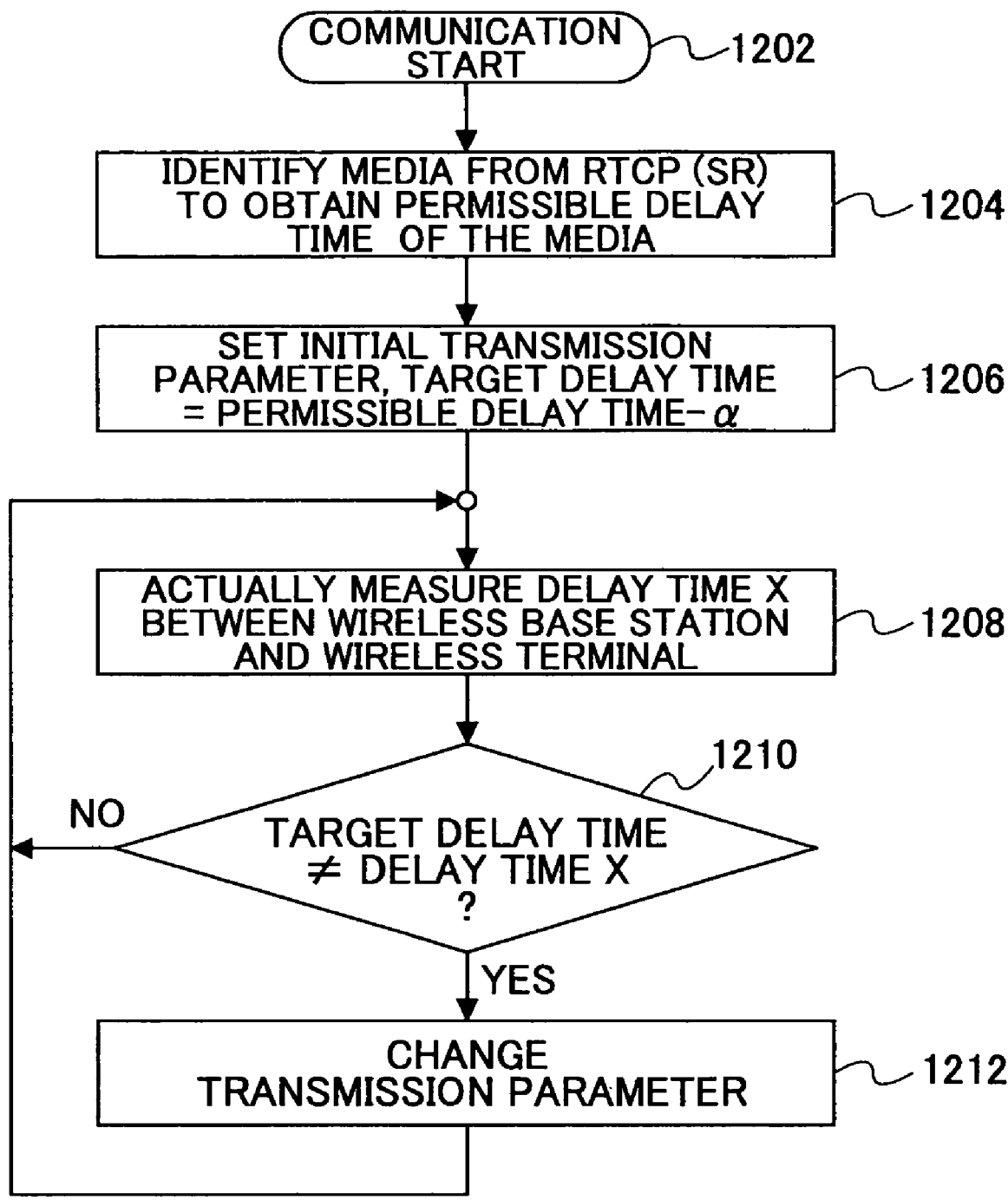
FIG. 12 shows a flowchart indicating an operation example of the transmission parameter control apparatus in an embodiment of this application.

FIG. 12 shows a flowchart showing another operation of the transmission parameter control apparatus 200 in the present invention. The flow 1200 is similar to the flow 600 shown in FIG. 6 except that the delay time instead of the jitter is obtained. The flow 1200 starts with step 1202 when communication starts, and goes to step 1204.

In step 1204, real-time media that are a transmission object are identified based on information included in the RTCP (SR), so as to obtain a permissible delay time of the real-time media.

In step 1206, an initial transmission parameter is set. In addition, a target delay time is set by subtracting a value α from the permissible delay time. The value α is a value ($\leq$permissible delay time) that is worst in measured packet delay times between the wireless base station and the fixed terminal (section A).

In step 1208, a delay time X between the wireless base station and the mobile terminal (section B) is measured.

In step 1210, it is determined whether the target delay time is the same as the packet delay time X in the section B. When they are the same (when No), the flow 1200 returns back to the step 1208, and the measurement step is repeated. When they are not the same (Yes), the flow 1200 goes to the step 1212.

In step 1212, the transmission parameter such as the number of retransmissions is adjusted such that the packet delay time X comes close to the target delay time. Then, returning back to the step 1208, communications that use the updated transmission parameter are performed. The adjustment performed in the step 1212 can be performed in the above-mentioned way (FIG. 11).

According to this flow, instead of measuring the packet delay time for the cable communication section A at each time, the value is represented as (fixed to) the worst value α, so that the transmission parameter of the wireless section is adjusted such that the sum of the worst value α and the packet delay time in the wireless communication section B falls within the permissible delay time of the real-time media. According to this embodiment, since a difference between the permissible delay time and the worst value α is almost constant (it is assumed that the worst value is not frequently updated), feedback control is performed such that the delay time for the section B becomes constant.

Figure 13:
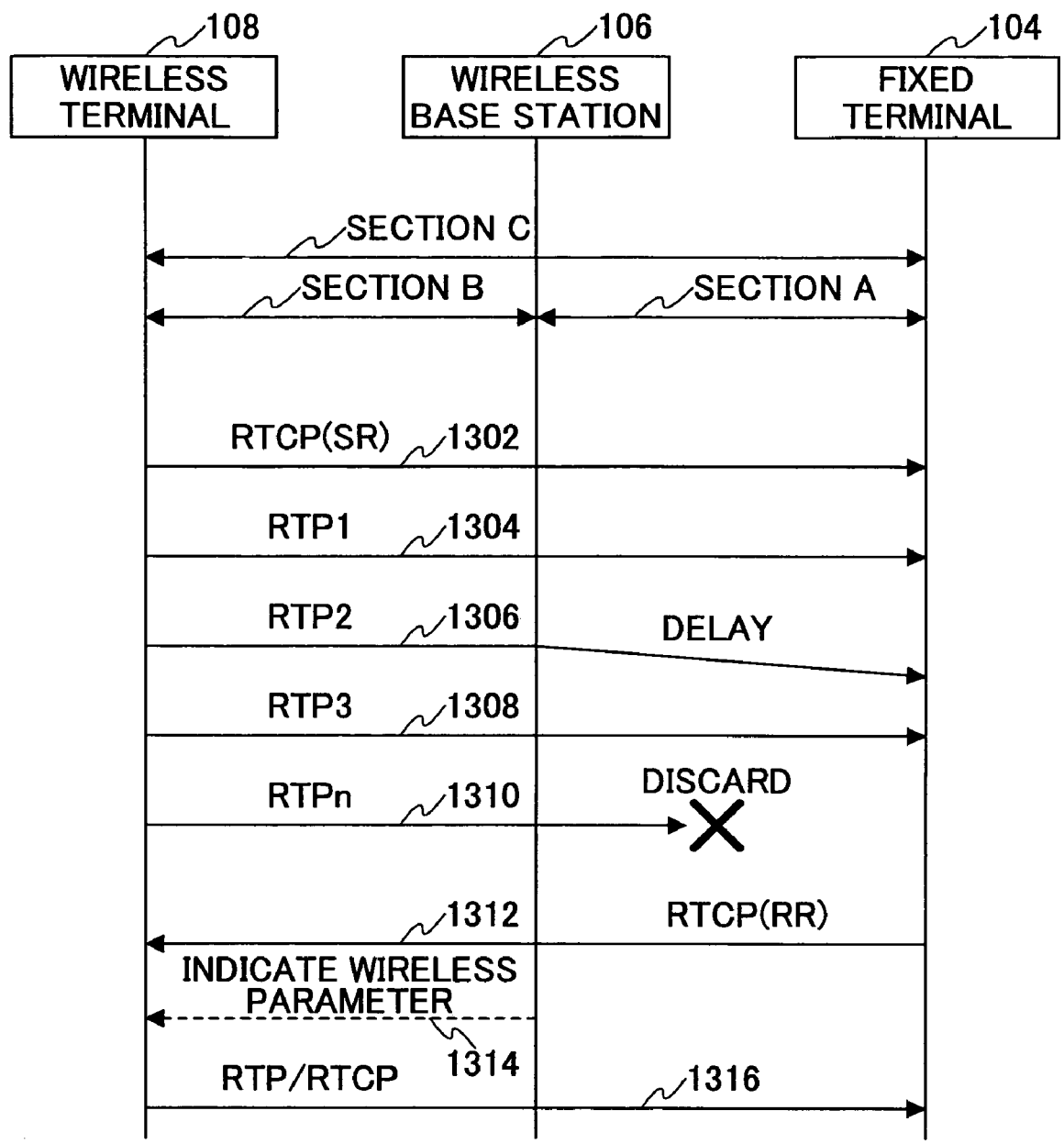
FIG. 13 is a figure showing another signal transmission sequence in an embodiment of this application.

FIG. 13 shows an example of another signal transmission sequence according to the present embodiment. In this example, conversely with respect to the sequence of FIG. 3, video data are transmitted from the mobile terminal 108 to the fixed terminal 104 (in the uplink direction). For convenience in explanation, reference numbers 1302-1316 indicate signal transmission at various time points in uplink or downlink.

As shown by the reference number 1302, first, the RTCP packet is transmitted from the mobile terminal 108. The RTCP packet transmitted at this time includes the sender report (SR), which is report information from the sender side to the receiver side. As mentioned before, the sender report (SR) includes information such as (a) NTP time stamp, (b) RTP time stamp, (c) number of transmission packets, (d) number of transmission bytes.

The RTCP packet indicated by the reference number 1302 branches off, on the uplink transmission route, and is supplied to the clock synchronization part 210 in the transmission parameter control apparatus 200 in the wireless base station 106. The clock synchronization part 210 extracts the NTP time stamp and the RTP time stamp from the RTCP packet (SR) so as to synchronize the apparatus with the reference time.

As shown by the reference numbers 1304-1310, the RTP packets are transmitted over the uplink transmission route in order. Each RTP packet includes header information and payload corresponding to contents of video data. As described before, the header information includes (a) a sequence number and (b) an RTP time stamp, for example.

Each RTP packet is introduced into the clock synchronization part 210 and the sequence number and the RTP time stamp are extracted. Information extracted in the clock synchronization part 210 are provided to each component (the jitter calculation part 214, the packet discard ratio calculation part 216, the delay time calculation part 218) in the measurement part 212, so that the jitter, the packet discard ratio and the delay time are calculated.

As to the signal transmission indicated by the reference numbers 1302-1310, by measuring the quality parameters in the wireless base station 106 in the above-mentioned way, the quality parameters in the wireless communication section (section B) between the mobile terminal 108 and the wireless base station 106 can be obtained.

Next, as indicated by the reference number 1312, the RTCP packet is transmitted from the fixed terminal 104. The RTCP packet transmitted at this time point includes information called the receiver report (RR). The receiver report is report information from the receiver side to the sender side. As mentioned before, the receiver report (RR) includes (a) SSRC-n, (b) packet discard ratio, (c) total number of cumulative packets, (d) sequence number, (e) jitter of arriving time, (f) SR time stamp, (g) SR delay, and the like, for example.

When the RTCP including the above information is received by the wireless base station 106, a part of it is supplied to the clock synchronization part 210, and various information in the receiver report (RR) are extracted. The extracted information are supplied to the measurement part 212. The quality parameters of the real-time media in the information indicate values for the whole section C from the mobile terminal 108 to the fixed terminal 104. Thus, for example, the jitter calculation part 214 compares the value of the jitter for the whole section C with the value of jitter for the section B obtained previously (obtains difference between them), so that a jitter for the section A (=section C−section B) can be obtained. In the same way, the packet discard ratio and the delay time for the wireless communication section in the section A can be obtained. Accordingly, quality parameters of the real-time media for the whole section including the wireless communication section B can be obtained in the measurement part 212. The measurement result of the quality parameters are supplied to the parameter conversion part 220.

In the parameter conversion part 220, it is determined how the transmission parameters for determining the wireless transmission scheme is to be adjusted based on the measurement result of the quality parameters. This determination can be performed based on the above-mentioned tables (FIGS. 5, 8, and 11). The determined transmission parameters are set in the R-MAC conversion part 206, and are used for communications hereinafter. In this process, it is necessary to report, to the mobile terminal 108, that the change or update of the transmission parameters has been performed. In this regard, the control part 222 writes, at the time indicated by the reference number 1314, the changed information of the parameters into the downlink control channel (individual control information part of the RTCP packet, for example) so as to be able to report the information.

Figure 14:
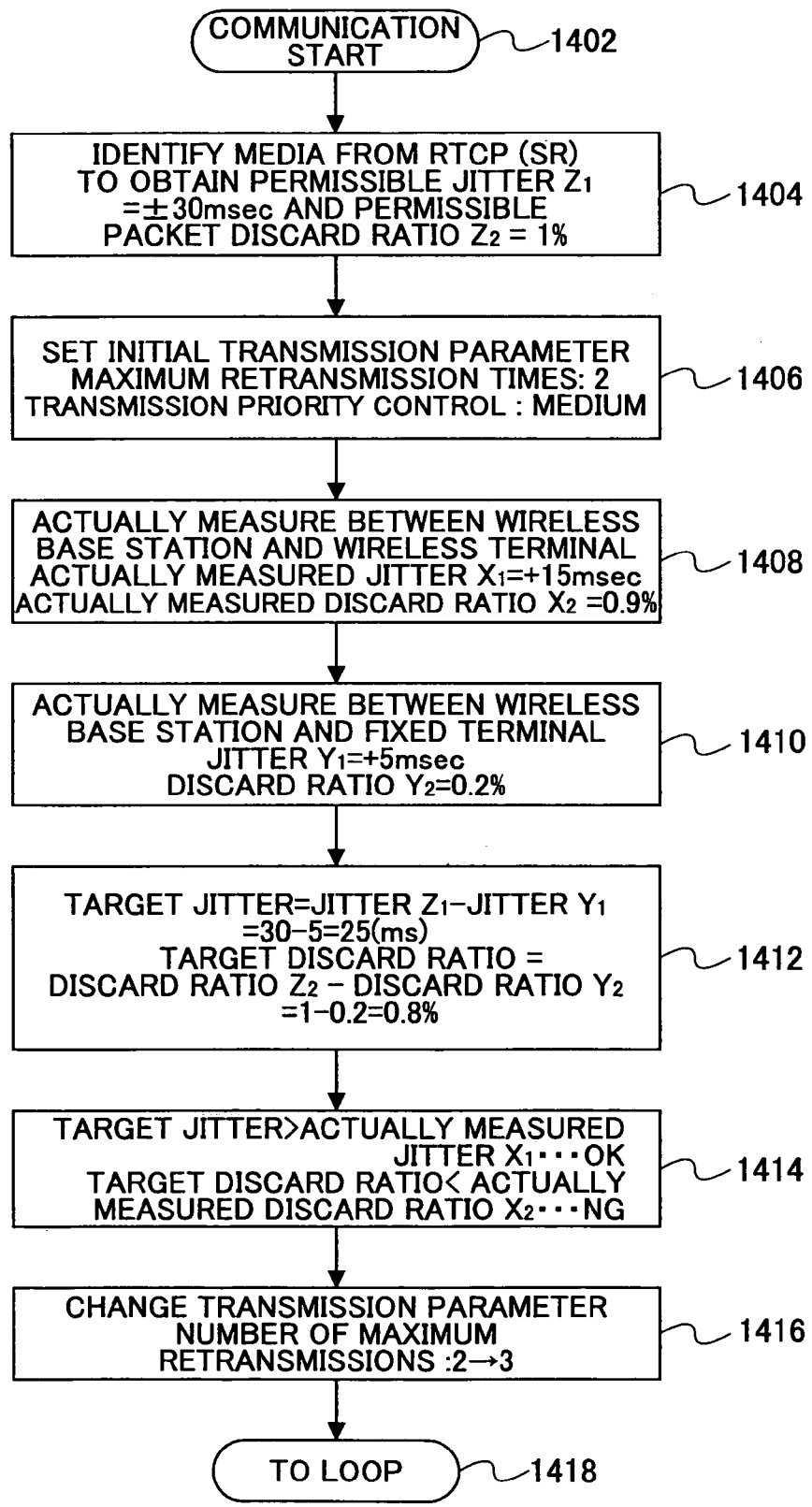
FIG. 14 shows a flowchart indicating an operation example of the transmission parameter control apparatus in an embodiment of this application.

FIG. 14 shows a flowchart indicating a concrete example of transmission parameter control in the present embodiment. In this example, it is assumed that video data are transmitted from the fixed terminal 104 to the mobile terminal 108 (in the downlink direction). In this example, it is assumed to adjust the number of retransmissions (transmission parameter) of the wireless packet while measuring the jitter and the packet discard ratio (quality parameters of the real-time media). It is assumed that the permissible jitter of the real-time media is ±30 ms and that the permissible packet discard ratio is 1.0%. Further, it is assumed that the signal round trip time in the wireless section is 10 ms.

The flow 1400 starts with step 1402, and goes to the step 1404.

In step 1404, real-time media is identified from the RTCP (SR), so that permissible jitter $Z1=\pm 30$ ms and permissible packet discard ratio $Z2=1.0\%$ are obtained.

In step 1406, an initial transmission parameter is set. In this example, the maximum number of retransmissions is set to be 2, and the transmission priority is set to be the second (medium) level among three stages (high, medium, low).

In step 1408, the jitter and the packet discard ratio between the wireless base station and the mobile terminal (section B) are measured. In the measured values, jitter $X1=\pm 15$ ms, and the packet discard ratio $X2=0.9\%$.

In step 1410, the jitter and the packet discard ratio between the fixed terminal and the wireless base station (section A) are measured. In the measured values, jitter $Y1=\pm 5$ ms, and the packet discard ratio $Y2=0.2\%$.

In step 1412, the target jitter and the target discard ratio are calculated as follows:

$$\text{Target jitter} = \text{permissible jitter } Z1 - \text{jitter } Y1 = 30 - 5 = 25 \text{ (ms); and}$$

$$\text{Target discard ratio} = \text{permissible discard ratio } Z2 - \text{packet discard ratio } Y2 = 1.0 - 0.2 = 0.8 \text{ (\%)}$$

In step 1414, comparison between the measured values X1, X2 and the target values is performed to determine propriety of the measured values.

Target jitter=25 ms>the measured value X1=15 ms holds true. Thus, it can be understood that the jitter has a margin. It is desirable to increase the jitter.

Target discard ratio=0.8%<the measured value X2=0.9% holds true. Thus, it can be understood that, since the packet discard ratio exceeds by 0.1% compared with the target value, it should be decreased.

In step 1416, the transmission parameter is reset such that the maximum number of retransmissions increases from two to three. Since the number of retransmissions increases, the packet discard ratio decreases. On the other hand, the number of retransmissions increases by 1, the delay time increases by 10 ms at the maximum. This increment is to be added to the jitter X1. Since 15 ms (X1)+10 ms (maximum increment)=25 ms is equal to the target jitter value, this falls within the permissible range of the jitter. Therefore, by increasing the number of retransmissions by one, it can be estimated that both conditions of the jitter and the packet discard ratio can be satisfied.

As mentioned above, according to the transmission parameter control apparatus of the present embodiment, transmission quality of real-time media in a transmission route having a wireless section in at least a part of the transmission route can be improved. In addition, according to the transmission parameter control apparatus of the present embodiment, by controlling the transmission parameter for wireless communications while measuring the transmission quality of the real-time media, transmission quality of real-time media in a transmission route having a wireless section in at least a part of the transmission route can be improved.

According to the present embodiment, when the wireless base station (the transmission parameter control apparatus provided in the wireless base station) adjusts the transmission parameter of the wireless link between the wireless base station and the mobile station, control is performed such that the quality parameter (jitter, packet discard ratio, delay time) of the real-time media falls within a proper range. This point is largely different from the conventional method in which the transmission parameter of the wireless link is controlled such that the wireless communication quality (S/N ratio, FER, and the like) becomes proper.

The transmission parameter control apparatus of the present embodiment optimizes the transmission parameter of the wireless link from the viewpoint of the quality parameter of the real-time media. Thus, a situation to keep the quality of the wireless link excessively high from the viewpoint of only the wireless communication quality can be avoided. Therefore, utilization efficiency of communication resources of the system as a whole can be improved.

Since the optimization of the transmission parameter of the wireless link is performed in the transmission parameter control apparatus provided between the mobile terminal and the fixed terminal, it is not necessary that the fixed terminal changes contents of a transmission signal and a transmission method for each mobile terminal individually. Therefore, even though the number of mobile terminals to communicate with the fixed terminal increases, since the transmission parameter control apparatus can individually optimize the transmission parameter of the wireless link, control for data transmission does not become complicated to such an extent concerned before. Also this point may contribute improvement of the data transmission efficiency of the whole system.

The present invention is not limited to the specifically disclosed embodiments, and variations and modifications may be made without departing from the scope of the invention.

What is claimed is:

1. A transmission parameter control apparatus that is connected to a terminal via a network and that is connected to a mobile terminal via a wireless link, comprising:
an obtaining part for obtaining a quality parameter indicating transmission quality corresponding to the wireless link from signals of downlink and uplink transmission routes; and
an adjustment part for adjusting a value of a transmission parameter that determines a transmission scheme in the wireless link according to the quality parameter.

2. The transmission parameter control apparatus as claimed in claim 1, comprising:
an extraction part for extracting a time stamp on a voice or video signal from a signal on a downlink transmission route to the mobile terminal or from a signal on an uplink transmission route to the fixed terminal.

3. The transmission parameter control apparatus as claimed in claim 1, wherein the obtaining part determines quality parameter obtained from the signal of the downlink transmission route to be first quality parameter between the terminal and the transmission parameter control apparatus, and derives the quality parameter corresponding to the wireless link from a difference between the first quality parameter and a second quality parameter obtained from the signal of the uplink transmission route.

4. The transmission parameter control apparatus as claimed in claim 1, wherein the quality parameter is represented by a jitter indicating fluctuations of packet transfer time, a packet discard ratio or a packet delay time.

5. The transmission parameter control apparatus as claimed in claim 1, wherein the transmission parameter that determines the transmission scheme of the wireless link is represented by a number of packet retransmissions, a transmission priority of packet, or an error correction level.

6. The transmission parameter control apparatus as claimed in claim 4, wherein the adjustment part performs adjustment such that a number of packet retransmissions decreases or increases according to size of the jitter.

7. The transmission parameter control apparatus as claimed in claim 4, wherein the adjustment part performs adjustment such that a transmission priority of packet is heightened or lowered according to size of the jitter.

8. The transmission parameter control apparatus as claimed in claim 4, wherein the adjustment part performs adjustment such that a number of packet retransmissions increases or decreases according to size of the packet discard ratio.

9. The transmission parameter control apparatus as claimed in claim 4, wherein the adjustment part performs adjustment such that an error correction level is heightened or lowered according to size of the packet discard ratio.

10. The transmission parameter control apparatus as claimed in claim 4, wherein the adjustment part performs adjustment such that a number of packet retransmissions decreases or increases according to size of the delay time.

11. The transmission parameter control apparatus as claimed in claim 4, wherein the adjustment part performs adjustment such that an error correction level is lowered or heightened according to size of the delay time.

12. The transmission parameter control apparatus as claimed in claim 4, wherein the adjustment part performs adjustment such that a transmission priority of packet is heightened or lowered according to size of the delay time.

* * * * *